United States Patent [19]

White

[11] 4,266,103
[45] May 5, 1981

[54] KEY TELEPHONE EXCLUSION CIRCUIT

[75] Inventor: Thomas E. White, Glen Ellyn, Ill.

[73] Assignee: GTE Automatic Electric Laboratories Inc., Northlake, Ill.

[21] Appl. No.: 60,937

[22] Filed: Jul. 26, 1979

[51] Int. Cl.³ .............................................. H04M 1/70
[52] U.S. Cl. ................................ 179/99 E; 179/17 B; 179/38
[58] Field of Search ............... 179/17 B, 18 FA, 99 R, 179/99 E, 99 LS, 37, 38

[56] References Cited

U.S. PATENT DOCUMENTS

| 3,725,601 | 4/1973 | Setzt et al. | 179/99 E |
| 3,909,552 | 9/1975 | Kerman et al. | 179/99 R |
| 3,941,943 | 3/1976 | Matheny | 179/99 E |
| 4,053,720 | 10/1977 | Wycheck et al. | 179/99 E |
| 4,075,434 | 2/1978 | Merritt, Jr. | 179/99 E |
| 4,081,624 | 3/1978 | Kerman et al. | 179/99 E |
| 4,117,274 | 9/1978 | Cannon et al. | 179/99 E |
| 4,158,111 | 6/1979 | Saxon | 179/99 E |

Primary Examiner—Gerald L. Brigance
Attorney, Agent, or Firm—Robert J. Black; Gregory G. Hendricks

[57] ABSTRACT

An exclusion circuit for use in a key telephone providing an exclusion release feature. Key telephones are excluded or prevented from accessing a busy line by the exclusion circuit. The exclusion release feature, in a key telephone connected to a telephone line, is operated in response to operation of an exclusion release key or partial operation of a hold key, to allow an associated excluded key telephone to connect to a busy telephone line.

9 Claims, 1 Drawing Figure

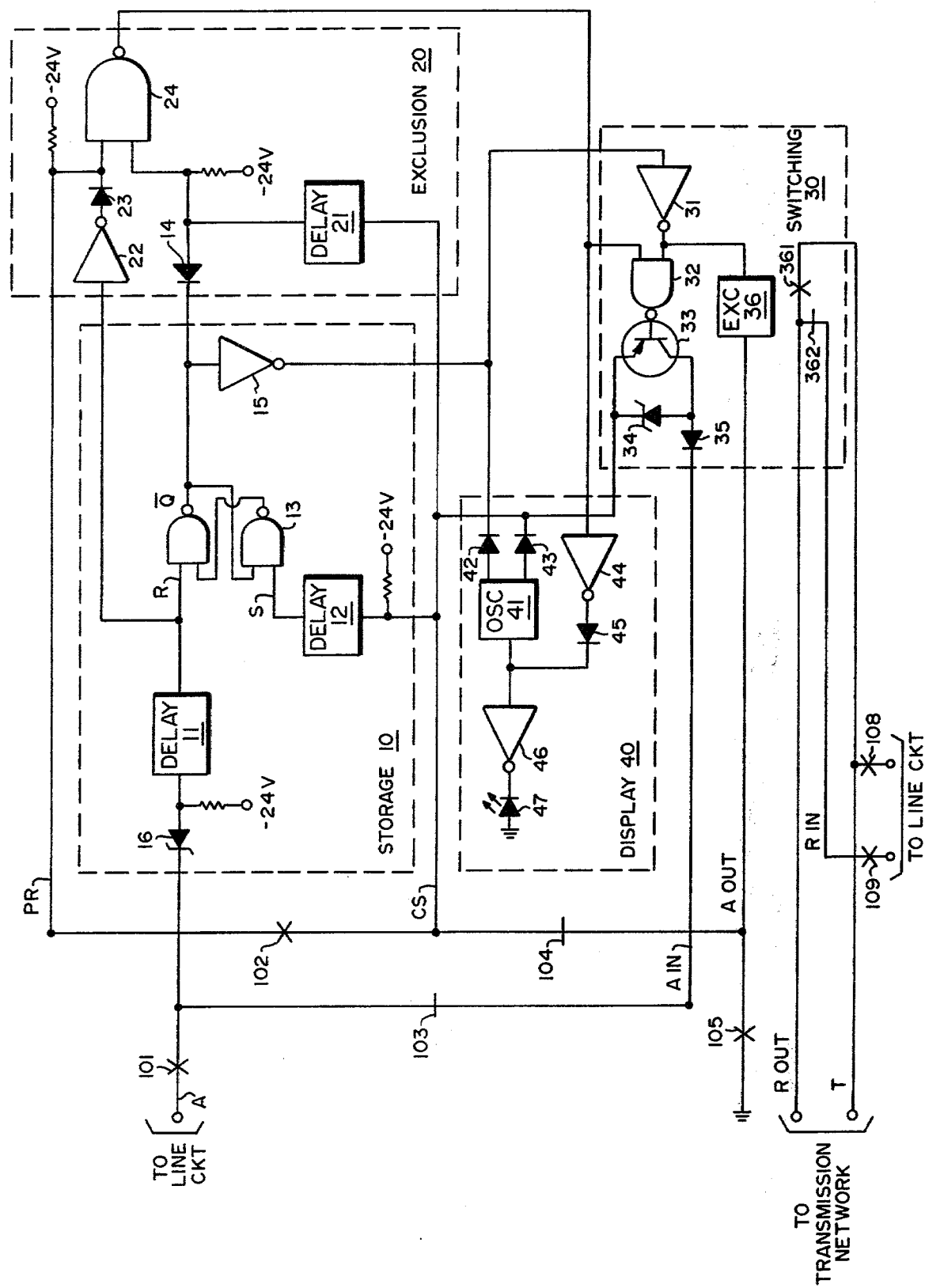

KEY TELEPHONE EXCLUSION CIRCUIT

BACKGROUND OF THE INVENTION (1) Field of the Invention

The present invention relates to key telephones and more particularly to an electronic exclusion circuit for use in said key telephones. This exclusion circuit provides an exclusion release feature operated in response to operation of an exclusion release key or partial operation of a hold key.

(2) Description of the Prior Art

Automatic exclusion circuits are old and well known and operate to exclude telephones from busy lines. Such a circuit is shown in U.S. Pat. Nos. 3,961,144 and 4,021,621.

An exclusion release feature is also known in the prior art whereby a telephone connected to a telephone line can release an excluded telephone, thereby allowing that telephone to connect to the busy line. Such a circuit is shown in U.S. Pat. Nos. 4,053,720 and 4,117,274. Both of these circuits require operation of an exclusion release key to provide this feature.

The exclusion release function can also be performed by partial operation of the hold key as disclosed in GTE Automatic Electric Incorporated circuit WW-14615.

However, these prior art exclusion release circuits do not provide the exclusion release function through both partial operation of a hold key and operation of an exclusion release key. Furthermore, none of these circuits provide a visual indication of the excluded state of a key telephone or operation of the exclusion release function of a key telephone.

GTE Automatic Electric Incorporated circuit, HH-880054-1 provides these features, however, it is implemented by means of relay logic. These components create cost and reliability problems.

Accordingly, it is the object of the present invention to provide a novel, low cost and highly reliable exclusion release circuit.

A feature of the present invention is an exclusion release function controlled by either partial operation of a hold key or operation of a dedicated exclusion release key.

Another feature of the present invention is provision of a visual indication of the excluded state of a key telephone and the operation of the exclusion release function.

SUMMARY OF THE INVENTION

The exclusion circuit of the present invention connects to the A lead of a key telephone via a line pickup key. It also connects to ground via a hookswitch and to a telephone line via the line pickup key.

This circuit includes a storage circuit connected between an A lead of a line circuit and an exclusion release control circuit which is connected to an exclusion release key. A switching circuit is connected to the storage circuit, the exclusion release control circuit, a telephone line, and the A lead. Finally a display circuit is connected to the storage circuit and the exclusion release control circuit.

The exclusion release circuit has four modes of operation. If connected to a idle line, a flip-flop, included in the storage circuit, resets in response to an idle signal on the A lead, to inhibit the exclusion release control gate and operate a switching circuit which switches a ground signal to the A lead. This ground signal is used to indicate busy.

If this circuit is connected to a busy line as indicated by ground on the A lead the flip-flop is set in response to such busy signal and causes operation of the switching circuit which operates the exclusion relay to shunt the tip and ring leads together. This will disable the associated telephone. The oscillator also responds to this state of the flip-flop to cause the LED to flash indicating the exclusion state.

If this circuit has been excluded from a busy line it can be released from the exclusion state by another key telephone which applies a minus 10 volt signal to the A lead or momentarily opens the A lead without breaking the tip and ring leads. The flip-flop reset in response to either of these signals to cause the switching circuit to release the exclusion relay thereby connecting the tip and ring leads of the associated key telephone to the line with the call in progress. The oscillator and LED are also turned off when the flip-flop resets and switching circuit will then apply a ground signal to the A lead to indicate busy status.

This circuit can also be used to release other exclusion circuits from the excluded state. The exclusion release control circuit responds to operation of the exclusion release key to cause the switching circuit to apply a minus 10 volt signal to the A lead. This circuit will also operate to apply minus 10 volts to the A lead in response to partial operation of the hold key, such that the A lead is disconnected while not disconnecting the tip and ring leads. The exclusion circuit of other key telephones will respond to the minus 10 volt signal by connecting to the associated line.

DESCRIPTION OF THE DRAWINGS

The single FIGURE of the accompanying drawing is a circuit diagram of an electronic exclusion circuit in accordance with the present invention.

DESCRIPTION OF THE PREFERRED EMBODIMENT

Referring now to the accompanying drawing, the key telephone exclusion circuit of the present invention is shown. The oscillator and delay circuits, are all well known. Commercially available integrated circuits may be readily used by those skilled in the art to implement these elements. The exclusion circuit of the present invention is connectable to an A lead of a line circuit of an associated key telephone via make contacts 101 associated with a line pick-up key. Zener diode 16 is connected between contacts 101 and delay circuit 11 which is further connected to a reset input of flip-flop 13. Inverter 22 is also connected to said reset input and its output is connected via diode 23 to a PR lead which is connected to a first input of exclusion release control gate 24. Delay circuit 12 is connected to a set input of flip-flop 13 and also to a CS lead which is further connected to delay circuit 21. Delay circuit 21, inverter 15 and diode 14 are all connected to a second input of gate 24. Diode 14 is also connected to the $\overline{Q}$ lead of flip-flop 13. Inverter 15 is further connected gate 31 and to oscillator 41 via diode 42. The CS lead is further connected to a second input of oscillator 41 via a diode 43, to zener diode 34, and also to a collector lead of transistor 33. The output lead of gate 24 is connected to a first input of gate 32 and to inverter 44 which is connected to gate 46 via diode 45. The output of inverter 31 is connected to a second input of gate 32 and also to exclusion relay 36 which is connectable to ground via hookswitch make contacts 105, included in an A-out lead. Zener diode 34 is also connected to an emitter lead of transistor 33 and to diode 35 included in an A-in lead. The output of oscillator 90 is connected to gate 46 which is connected to ground via light emitting diode 47. The PR lead is connected to the CS lead via exclusion release key contacts 102 and the CS lead is further connected to the A-out lead via chaining switch contacts 104. Also the A-in lead is connected to the A lead via hold key contacts 103. A tip lead is connectable to an R-out lead via exclusion relay contacts 361, and a R-in lead is connected to the R-out lead via an exclusion relay contacts 362.

The key telephone exclusion circuit of the present invention performs different functions depending on whether it is operating in response to being connected to an idle line, or in response to being connected to a busy line. This circuit can also be operated to release other exclusion circuits from an excluded state or it can be released from an excluded state by another key telephone.

If a key telephone is connected to an idle line contacts 101 are operated by an associated line pick-up key to connect the A lead of the line circuit to the exclusion circuit. Since there is no voltage on the A lead in the idle state a minus 24 volt bias connected to delay circuit 11 provides a logic 0 input to delay circuit 11. This logic 0 signal also appears on the output of delay circuit 11 and therefore on the reset lead of flip-flop 13. When the key telephone went off-hook, hookswitch contacts 105 connected ground to the A-out lead and therefore also to the CS lead. Delay circuit 12 transferred this logic 1 signal to the set input of flip-flop 13. Thus flip-flop 13 was reset with a logic 1 on its $\overline{Q}$ lead. Flip-flop 13 will remain reset under any A lead conditions after latching in this manner. Inverter 15 converts the logic 1 on the $\overline{Q}$ lead to a logic 0 which causes inverter 31 to generate a logic 1 signal. Gate 32 responds by generating a logic 0 signal which causes transistor 33 to turn on and connect the A lead to ground via the CS lead and A-out lead. The A lead is connected to ground to indicate that the line is busy. Zener diode 16 then breaks down in response to this ground signal and transfers this logic 1 signal to delay circuit 11. Delay circuit 11 delays signals approximately 5 times as long as delay circuit 12 to insure that the CS lead retains control of flip-flop 13. This logic 1 signal from delay circuit 11 appears on the reset input of flip-flop 13 but has not effect since the flip-flop is latched in a reset state. However, inverter 22 converts this logic 1 signal to a logic 0 thereby inhibiting gate 40 and preventing operation of the exclusion release function. The logic 1 on the CS lead also appears at the input of delay circuit 21 however this signal is delayed by 15 milliseconds before it appears at the second input of gate 24. Since delay circuit 11 represents only a 2.5 millisecond delay while delay circuit 21 represents a 15 millisecond delay, the logic 1 signal from delay circuit 11 is inverted to a logic 0 signal by inverter 22 thereby inhibiting gate 24 before the logic 1 signal on a CS lead appears at the second input to gate 24.

When this circuit is connected to a busy line a ground appears on the A lead via contacts 101 associated with the line pick-up key. This logic 1 signal is transferred to delay circuit 11 via zener diode 16. Since chaining switch contacts 104 are momentarily opened when a line pick-up key is depressed the hookswitch ground is not transferred to the CS lead and consequently a logic 0 signal from a minus 24 volt bias, via delay circuit 12, appears on the set input of flip-flop 13. Consequently flip-flop 30 is set with a resultant logic 0 signal on its $\overline{Q}$ lead. Therefore the A lead has control of the flip-flop since a change in logic on the CS lead will not effect the state of flip-flop 13. This logic 0 signal on the $\overline{Q}$ lead inhibits the exclusion release function by inhibiting gate 24. This logic 0 signal on the $\overline{Q}$ lead is also inverted to a logic 1 signal by inverter 15. This logic 1 signal causes inverter 31 to generate a logic 0 signal which operates exclusion relay 36 via hookswitch ground on the A-out lead. When exclusion relay 36 operates the R-out lead is shunted directly to the tip lead via contacts 361. The R-in lead is also disconnected via contacts 362. The excluded key telephone is thus disabled. The logic 0 generated by inverter 31 causes gate 32 to generate a logic 1 signal which turns off transistor 33 thereby preventing transfer of hookswitch ground via the CS lead to the A lead. The logic 1 signal from inverter 15 also operates oscillator 41 which causes gate 46 to oscillate thereby causing light emitting diode 47 to flash. This flashing lamp is a visual indication that the telephone is in the excluded state.

An excluded key telephone can be released from the excluded state if another key telephone applies an open circuit condition or negative voltage to the A lead. Zener diode 16 detects this open circuit condition or negative voltage signal and prevents current to flow to delay circuit 11 thereby causing the minus 24 volt bias to place a logic 0 signal on the input of delay circuit 11. This logic 0 signal causes flip-flop 13 to reset resulting in a logic 1 signal on its $\overline{Q}$ lead. The logic 1 signal on the $\overline{Q}$ lead of flip-flop 13 is inverted by inverter 15 to a logic 0 signal which causes gate 31 to generate a logic 1 signal thereby causing exclusion relay 36 to release. This results in contacts 361 opening and contacts 362 closing. Therefore the tip and ring leads are no longer disabled and the excluded telephone becomes operational. Gate 32 responds to the logic 1 signal generated by inverter 31, by generating a logic 0 signal which causes transistor 33 to turn on and transfer hookswitch ground from the CS lead to the A lead to indicate busy. This ground is then detected by zener diode 16 as a logic 1 signal and transferred to delay circuit 11. This logic 1 signal is then inverted by inverter 22 to a logic 0 signal to again inhibit exclusion release control gate 24.

This exclusion circuit can also be operated to release another key telephone, that is in the excluded state, by removing the ground from the A lead and applying a minus 10 volt signal to the A lead. When the exclusion release key is operated contacts 102 connect the CS lead to the PR lead. Consequently hookswitch ground or logic 1 appears on a first input to exclusion release control gate 24. This logic 1 signal on the CS lead also appears on a second input of exclusion release control gate 24 via delay circuit 21. Consequently exclusion release control gate 24 becomes operative and applies a logic 0 signal to gate 32 which generates a logic 1 signal causing transistor 33 to turn-off. The hookswitch ground on the CS lead then breaks down zener diode 34 causing a minus 10 volt signal to appear on the A lead. This minus 10 volt signal will appear as an idle signal to other exclusion circuits, which will then connect to the line. This minus 10 volt signal is blocked by zener diode 10 causing a logic 0 signal to be transferred to inverter 22 by delay circuit 11. Inverter 22 inverts this logic 0 signal to a logic 1 thereby causing exclusion release control gate 24 to remain operated after exclusion release contacts 102 are released. Inverter 44 inverts the logic 0 signal from the exclusion release control gate 24 to a logic 1 signal which causes gate 46 to generate a logic 0 signal which turns on light emitting diode 47. This is a visual indication that the exclusion release circuit is operating. Once the excluded phone responds and applies ground to the A lead this logic 1 signal will be inverted to a logic 0 signal by inverter 22. Consequently exclusion release control gate 24 will generate a logic 1 signal which will be inverted by gate 46 causing light emitting diode 47 to extinguish. This is a visual indication that the excluded telephone has connected to the line. Gate 32 also responds to the logic 1 signal from gate 24, by generating a logic 0 signal which turns on transistor 33, thereby removing minus 10 volts from the A leads reapplying ground to the A lead. If the hold key is partially depressed without disconnecting the tip and ring leads the same result occurs since a logic 0 signal is transferred to inverter 22 by delay circuit 11. Inverter 22 then applies a logic 1 signal to the PR lead and gate 24 responds the same as it would if the exclusion release key caused a ground to be connected to the PR lead via contacts 102.

The exclusion circuit of the present invention thus has four modes of operation. If it is connected to an idle line it operates in response to an idle signal on the A lead, to apply a busy signal to the A lead. If it is connected to a busy line, it operates in response to a busy signal on the A lead to disable the associated telephone by shunting the tip and ring leads together and opening the ring lead. It also causes a light emitting diode to flash as an indication that it has been excluded. If this circuit is to be released from an excluded state it operates in response to an open circuit condition, or minus 10 volt signal to remove the shunt across the tip and ring leads, reconnect the ring lead, extinguish the flashing light emitting diode, and apply ground to the A lead. This circuit can also be used to release an excluded telephone. In this mode of operation, it responds to operation of the exclusion release key or partial operation of the hold key, to apply a minus 10 volt signal to the A lead. It also turns on the light emitting diode which is extinguished when the excluded telephone applies a ground signal to the A lead.

It will be obvious to those skilled in the art that numerous modifications of the present invention can be made without departing from the spirit of the invention which shall be limited only by the scope of the claims appended hereto.

What is claimed is:

1. An exclusion circuit for use in a key telephone system including a plurality of key telephones, a common status lead and a telephone line, each of said telephones connectable to said status lead and said telephone line, each of said telephones operable to apply busy and idle signals to said status lead, and each of said telephones including a hold key and an exclusion release key, said exclusion circuit comprising:
   storage means operated in response to connection to said status lead and application of said busy signal to said status lead, to generate a busy detected signal, said storage means further operated in response to connection to said status lead and application of said idle signal to said status lead, to generate an idle detected signal;
   switching means connected to said storage means operated in response to said busy detected signal to prevent connection to said telephone line, said switching means further operated in response to said idle detected signal to apply said busy signal to said status lead;
   exclusion means connected to said exclusion release key, and to said hold key via said storage means, said storage means further operated in response to operation of said hold key to generate an exclusion release enable signal, said exclusion means operated in response to momentary operation of said exclusion key, and further operated in response to momentary presence of said exclusion release enable signal, to generate said exclusion release signal, said exclusion means further operated in response to a busy signal to inhibit said exclusion release signal;
   said switching means further connected to said exclusion means, operated in response to said exclusion release signal, to remove said busy signal from said status lead and to apply said idle signal to said status lead; and
   display means connected to said storage means and said exclusion means, operated in response to said busy detected signal to generate a periodic visual signal, further operated in response to said exclusion release signal to generate a steady visual signal, further operated in response to said idle detected signal to extinguish said periodic visual signal, and further operated in response to an absence of said exclusion release signal to extinguish said steady visual signal.

2. An exclusion circuit as claimed in claim 1, wherein: said switching means comprise a relay operated in response to said busy detected signal to prevent connection to said telephone line.

3. An exclusion circuit as claimed in claim 1, wherein there is further included a ground connection, said switching means further comprising: a gate circuit operated in response to said idle detected signal to connect said ground connection to said status lead.

4. An exclusion circuit as claimed in claim 1, wherein said switching means further comprise: a zener diode connectable to a bias signal supply, and connected to said gate circuit said gate circuit operated in response to said exclusion release signal to connect said zener diode to said bias signal supply, whereby said idle signal is applied to said status lead.

5. An exclusion circuit as claimed in claim 1, wherein said display means comprise: an oscillator, operated in response to said busy detected signal to generate a periodic control signal.

6. An exclusion circuit as claimed in claim 5, wherein said display means further comprise: a light emitting diode operated in response to said periodic control signal to generate said periodic visual signal, and further operated in response to said exclusion release signal to generate said steady visual signal.

7. An exclusion circuit as claimed in claim 1, wherein said exclusion means comprise: a latch circuit operated in response to momentary operation of said exclusion release key and further operated in response to momentary presence of said exclusion release enable signal to generate said exclusion release signal.

8. An exclusion circuit as claimed in claim 1, wherein said storage means comprise: a latch circuit having set and reset leads, first delay means connected between said set lead and said bias signal source, and second delay means connected between said reset lead and said status lead, said second delay means providing a delay longer than said first delay means, whereby said second delay means delays said busy signal generated by said switching means for a sufficient time to allow said latch circuit to store said idle signal appearing on said status lead.

9. An exclusion circuit as claimed in claim 8, wherein said exclusion means is connected to said second delay means, and said exclusion means further comprise: third delay means connected to said bias signal source providing a delay period longer than said second delay means, said third delay means operated to delay said bias signal for a time longer than required for said busy signal generated by said switching means to be applied to said exclusion means, whereby said exclusion release signal is inhibited by said busy signal.

* * * * *